US011500833B2

United States Patent
Dörre et al.

(10) Patent No.: US 11,500,833 B2
(45) Date of Patent: Nov. 15, 2022

(54) ARCHIVING ACCELERATOR-ONLY DATABASE TABLES

(71) Applicant: INTERNATIONAL BUSINESS MACHINES CORPORATION, Armonk, NY (US)

(72) Inventors: Felix Dörre, Karlsruhe (DE); Luis Eduardo Oliveira Lizardo, Böblingen (DE); Sascha Laudien, Berlin (DE); Knut Stolze, Hummelshain (DE)

(73) Assignee: International Business Machines Corporation, Armonk, NY (US)

(*) Notice: Subject to any disclaimer, the term of this patent is extended or adjusted under 35 U.S.C. 154(b) by 136 days.

(21) Appl. No.: 16/946,899

(22) Filed: Jul. 10, 2020

(65) Prior Publication Data
US 2022/0012217 A1    Jan. 13, 2022

(51) Int. Cl.
*G06F 16/21*    (2019.01)
*G06F 16/23*    (2019.01)

(52) U.S. Cl.
CPC ........ *G06F 16/214* (2019.01); *G06F 16/2379* (2019.01)

(58) Field of Classification Search
CPC ............ G06F 16/214; G06F 16/2379
See application file for complete search history.

(56) References Cited

U.S. PATENT DOCUMENTS 8,719,529 B2    5/2014   Benhase
9,971,777 B2    5/2018   Bertin
(Continued)

FOREIGN PATENT DOCUMENTS

CN    110837535 A    2/2020
KR    101786865 B1    10/2017

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Tamara T Kyle
*Assistant Examiner* — Lahcen Ennaji
(74) *Attorney, Agent, or Firm* — Schmeiser, Olsen & Watts, LLP; Stephanie Carusillo

(57) ABSTRACT

A DBMS manages a high-performance accelerated database that is synchronized with a conventional client database. The accelerated database contains both "regular" accelerated tables, which each duplicate a table of the client database, and accelerator-only tables (AOTs) that are unique to the accelerated database and that may be used for analytical purposes. AOT rows are archived by moving the rows to a dedicated accelerator-only archive stored in the accelerated database. When a user query attempts to access accelerator-only data, the DBMS rewrites the query to adapt the requested operations to the accelerated database's partitioned archive/non-archive structure. The rewritten query specifies steps for accessing archived and non-archived accelerator-only data without forcing the DBMS front-end to generate a merged view of archived and non-archived accelerator-only data. If the accelerator-only archives are stored in a read-only format, the rewriting also adds predictive operations that prevent queries from altering the archives.

20 Claims, 10 Drawing Sheets

(56) References Cited

U.S. PATENT DOCUMENTS

| | | | |
|---|---|---|---|
| 10,318,493 B2 | 6/2019 | Marwah | |
| 2005/0149584 A1* | 7/2005 | Bourbonnais | G06F 16/256 |
| 2007/0050333 A1* | 3/2007 | Vogler | G06F 16/22 |
| 2010/0185690 A1* | 7/2010 | Evans | G06F 16/113 |
| | | | 707/803 |
| 2014/0095441 A1 | 4/2014 | Draese | |
| 2014/0095442 A1 | 4/2014 | Guo | |
| 2015/0006489 A1* | 1/2015 | Fabijancic | G06F 16/113 |
| | | | 707/661 |
| 2016/0210316 A1 | 7/2016 | Bendel | |
| 2016/0210328 A1 | 7/2016 | Bendel | |
| 2017/0185604 A1 | 6/2017 | Broll | |
| 2019/0018880 A1* | 1/2019 | Bendel | G06F 16/23 |
| 2019/0243731 A1 | 8/2019 | Chainani | |

OTHER PUBLICATIONS

Notification of Transmittal of the International Search Report and the Written Opinion of hte International Searching Authority, or the Declaration; dated Oct. 18, 2021; PCT/IB2021/056176; International filing date Jul. 9, 2021; 10 pages.

IBM; Accelerator-Only Tables: https://www.ibm.com/support/knowledgecenter/kk/SS4LQ8_5.1.0/com.ibm.datatools.aqt.doc/gui/concepts/c_idaa_aots.html; retrieved from the Internet Mar. 10, 2020; 8 pages.

Rielau, Serge; Updatable Union All Views in DB2 Universal Database Version 8; https://www.ibm.com/developerworks/data/library/techarticle/0209rielau/0209rielau-pdf.pdf; Sep. 12, 2002; 11 pages.

Stolze, Knut, et al.; Extending database accelerators for data transformations and predictive analytics; Advances in database technology-EDBT 2016: 19th International Conference on Extending Database Technology; Mar. 15-18, 2016; 2 pages.

Zuzarte, Calisto; Partitioning in DB2 Using the Union All View; https://www.ibm.com/developerworks/data/library/techarticle/0202zuzarte/0202zuzarte.pdf; retrieved from the Internet Mar. 10, 2020; 25 pages.

* cited by examiner

ARCHIVING ACCELERATOR-ONLY DATABASE TABLES

BACKGROUND

The present invention relates in general to database-management systems (DBMSs) and in particular to archiving accelerated database tables.

Archiving is the process of moving "cold" data, which is no longer actively used, to a dedicated archival storage repository. Archived database tables are generally stored in data archives, distinct from primary production database tables that contain active data, where the archived tables are indexed and searchable by DBMS users.

Migrating infrequently accessed archival data to a lower-cost storage medium reduces a DBMS's consumption of pricier primary storage and simplifies backup procedures. These benefits accrue when a DBMS can effectively inventory its currently active data in order to identify the best candidates for archiving. Some archiving systems protect archived from modification by storing it in a read-only format, but others allow users to modify archived tables.

Some DBMSs support a second "accelerated" database system capable of delivering the high-performance, low-latency response necessary for operations like generating real-time online analytics. An accelerated database may include both synchronized duplicates of active tables contained in a production database and "accelerator-only" tables ("AOTs") that exist only in the accelerated database.

SUMMARY

Embodiments of the present invention comprise systems, methods, and computer program products for creating and managing AOTs of a high-performance accelerated database that contain archived data. A DBMS manages the accelerated database and synchronizes certain "regular" tables of the accelerated database with identical tables of a conventional "client" database. In addition to the regular tables, the accelerated database also contains AOTs that are unique to the accelerated database and provide high-speed performance sufficient to satisfy the requirements of real-time applications. AOT rows are archived by moving the rows to a dedicated archive table or partition stored in the accelerated database. When a user query or other data-access request attempts to access accelerator-only data, the DBMS rewrites the query to adapt the requested operations to the accelerated database's partitioned archive/non-archive structure. The rewritten query specifies steps for accessing archived and non-archived accelerator-only data without forcing the DBMS to perform a resource-intensive UNION ALL operation to generate a merged view of archived and non-archived data. If the accelerator-only archives are stored in a read-only format, the rewriting also adds predictive operations that prevent queries from attempting to alter the archives.

DETAILED DESCRIPTION

Figure 1:
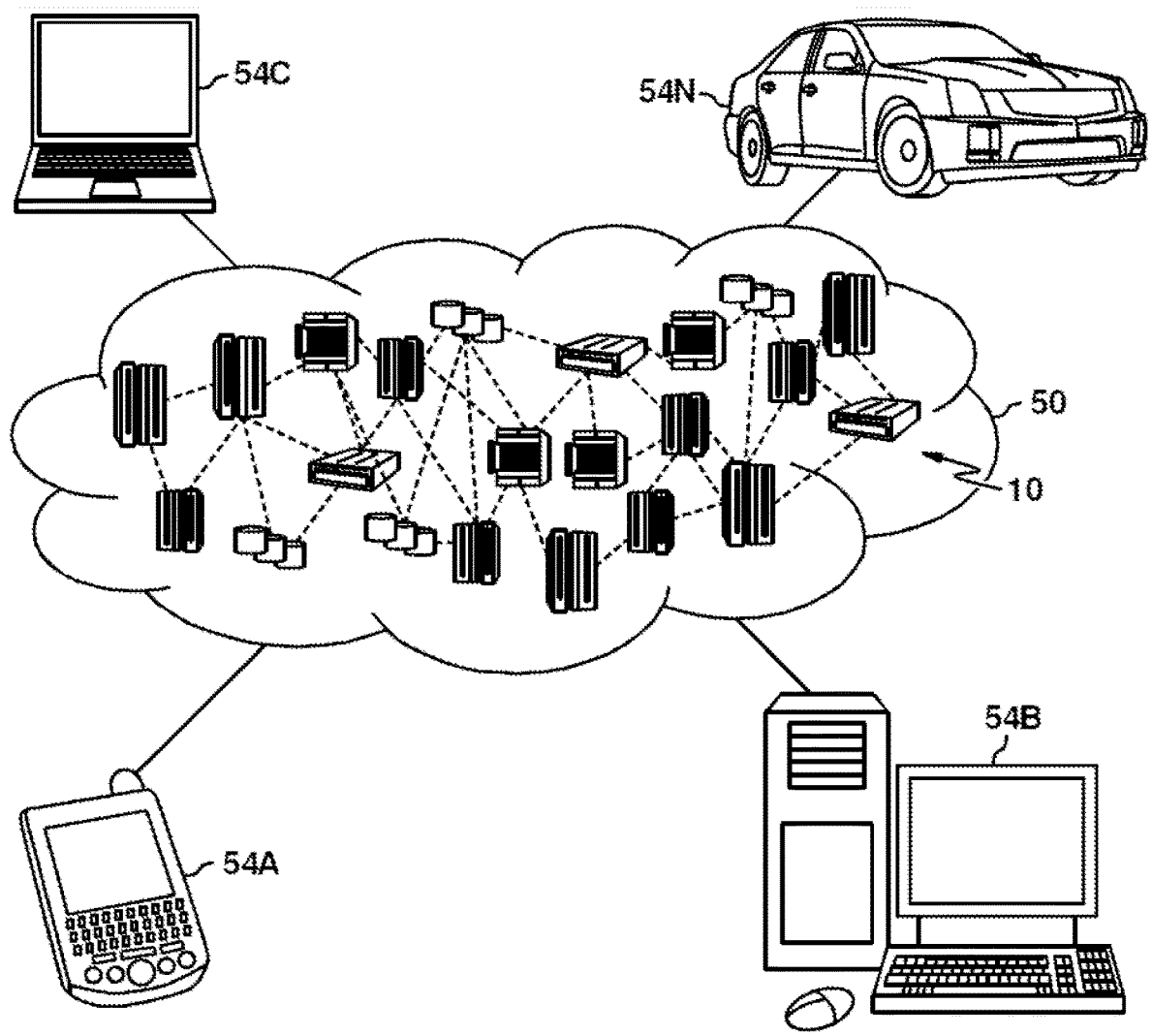
FIG. 1 depicts a cloud computing environment according to an embodiment of the present invention.

Embodiments of the present invention improve known DBMSs by providing a more efficient way to archive, and then access, database tables that exist only in an accelerated database.

A DBMS that manages a conventional client database, directly accessible by users and by the standard DBMS front-end, may also maintain a distinct "accelerated" database exclusively accessed by an accelerator component of the DBMS. When a SQL query or other data-access request attempts to access accelerated data, the DBMS forwards the request to the accelerator, which determines how best to access the requested data. If, for example, an administrator requests real-time or near-real-time statistics about the contents or usage of the client database, that request would be forwarded to the accelerator in order to reduce the latency time of the system's response.

An accelerated database contains "regular" accelerated tables that duplicate, and are synchronized with, corresponding tables of the conventional client database. This synchronization allows the accelerator to more accurately generate statistics and analytic reports about the client database's contents and can also reduce the time to retrieve and prepare large amounts of modeling input data required by a predictive modeling operation.

Accelerated databases may also contain "accelerator-only" tables (AOTs) that are exclusive to the accelerated database and have no analog in the client database. AOTs can be used for functions like storing metadata or usage statistics that describe characteristics of the client database. Users can optionally limit query results to only regular accelerated tables or to only AOTs.

In general, an AOT can be modified by a query's data-manipulation (DML) statements (such as a Structured Query Language (SQL) INSERT, UPDATE, and DELETE statement) executed by the dedicated accelerator component. Accelerators cannot, however, directly perform DML statements on rows of regular accelerated tables because doing so would desynchronize the manipulated rows with analogous rows in the client database.

As with other database tables, "cold" rows of a regular accelerated table can be archived in order to improve performance by reducing overall database size. When a table row in the client database is archived, its analogous row in the regular accelerated table is likewise archived in order to maintain synchrony between the two.

AOT rows may be selected for archiving by implementation-dependent criteria independent of the contents of the client database, since AOTs have no corresponding tables in the client database. Users who query an accelerated database may request access to only archived rows, only non-archived rows or both.

Unlike conventional databases, known accelerated databases do not archive AOTs. Archiving a conventional client table generally involves moving rows of the table data to a distinct archive repository, which is generally implemented on lower-performance, less-expensive storage. This reduces the amount of higher-priced storage needed to store the more active parts of the database and increases performance because queries accessing the client database's hot data do not have to search through archived data.

These benefits would not, however, accrue in the same way when archiving AOTs. AOTs run on a specialized platform distinct from that of the client database, so archiving accelerator-only data to a lower-performance storage medium would not reduce the client database's storage footprint or response time. Furthermore, even cold AOT data generally requires faster processing times than would be possible if archived AOT rows were moved to a lower-performance medium, such as optical disc or lower-speed hard drive. There has thus been no motivation in the field to implement systems that archive AOTs.

As will be described below, the present invention improves this mechanism by which accelerator-only data is managed by migrating archived rows of an AOT to a distinct AOT or partition, which, in some embodiments, is stored in a read-only format. This method also differs from the archiving mechanism used by known non-accelerated client databases because the present invention's accelerator-only archive remains within a partition of the accelerated database, rather than being migrated to a partition residing on lower-cost storage. Although not providing the same types of benefits accrued by offloading archives of a conventional client database, this novel structure reduces overhead and complexity within the accelerated database when a query requests archived AOT data, regardless of whether the query also requests non-archived AOT data. For example, if a query requests only archived AOT data or only non-archived AOT data, processing the query requires searching only partitions that contain the single desired class of data. The resulting performance improvements are especially important for accelerated systems expressly designed to service performance-critical functions.

The client DBMS's front-end receives and parses all incoming queries, regardless of whether a query requests access to client data or accelerated-only data. However, accelerated tables, archived or not, can be directly accessed only by the accelerated database's accelerator module. The DBMS front-end forwards parsed requests for accelerator-only data to the accelerator, which then performs the requested operations on the accelerated database.

When AOTs are split into archived and non-archived partitions, a query that accesses both archived and non-archived accelerated data, could require the DBMS front-end to first perform a UNION ALL operation that merges archived and non-archived data into a single searchable view or domain. The resulting view would then allow queries to then be performed entirely within the accelerated database by the accelerator. This UNION operation can, however, be resource-intensive when, as is often the case, large amounts of data must be merged.

Worse, queries that search through both regular accelerated tables and AOTs require additional filtering predicates in order to distinguish between the two types of data. For example, a query that requests only archived AOT data but specifies conditions that cannot be satisfied by existing archived AOT rows, must fail. Furthermore, DML query functions executed by an accelerator upon an accelerated database can manipulate data stored only in AOTs because modifying a regular accelerated table without also modifying a corresponding table in the client database would desynchronize the two. Processing a query therefore requires the accelerator to generate additional predicates that distinguish rows belonging to regular accelerated tables from rows that belong to AOTs, either or both before and after performing the query. For this reason, a query that selects either archived or non-archived data from AOTs must also perform additional filtering in order to distinguish archived table rows from non-archived rows.

In this manner, embodiments of the present invention improve the performance of known accelerator databases by providing a more efficient mechanism for archiving accelerator-only data and for servicing queries that access AOTs. These embodiments take advantage of the dual-database architecture's parsing and query-rewriting capabilities to eliminate the additional filtering predicates generated by known accelerators when querying AOT data.

Firstly, embodiments comprise a novel method of archiving records or tables of an AOT. Instead of merely marking an AOT or a record of an AOT as having been archived, the present invention moves the archived content into a second AOT, stored on the accelerated database, that is earmarked as containing only archived accelerator-only data. This eliminates the need to generate and execute ad hoc filtering predicates on AOT tables in order to distinguish between archived and non-archived records.

Embodiments also leverage the fact that the client database already incorporates a front-end capable of parsing incoming data-access requests. The present invention directs the client DBMS's front-end to perform novel steps of rewriting certain statements of a query that requests access to an AOT, prior to forwarding the modified query to the accelerator. The accelerator then uses known methods to perform the modified query on the accelerated database.

Unlike current DBMS implementations, this improvement allows all functions that distinguish between "hot" and "cold" (that is, non-archived and archived) rows of AOT data to be performed by the accelerator within the accelerated database. This eliminates the need for the client DBMS's front-end to create filtering predicates that distinguish between archived and non-archived accelerator-only content, to generate a preliminary merged view by performing a UNION ALL operation upon the queried accelerated-database content, and to then direct the accelerator to execute the query against the contents of the merged view. These enhancements improve performance, simplify query processing, and reduce lock-out time during which queried database tables or partitions are made unavailable while a complex query is serviced.

These enhancements alter only those operations of the client DBMS system that service queries of AOT data.

Implementing the rewriting procedure requires no modifications to the DBMS's application code for parsing and servicing queries that access only client database tables or regular tables of the accelerated database. These enhancements also eliminate the need for the client DBMS's front-end to generate filtering predicates that perform a UNION ALL operation in order to generate a merged view and then distinguish archived from non-archived accelerator-only data within that view. Finally, because embodiments of the present invention store archived and non-archived accelerated data in distinct accelerated tables or partitions, a compliant accelerator can service requests to access only archived AOT data or only non-archived AOT data without first determining which rows of each AOT contain archived data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
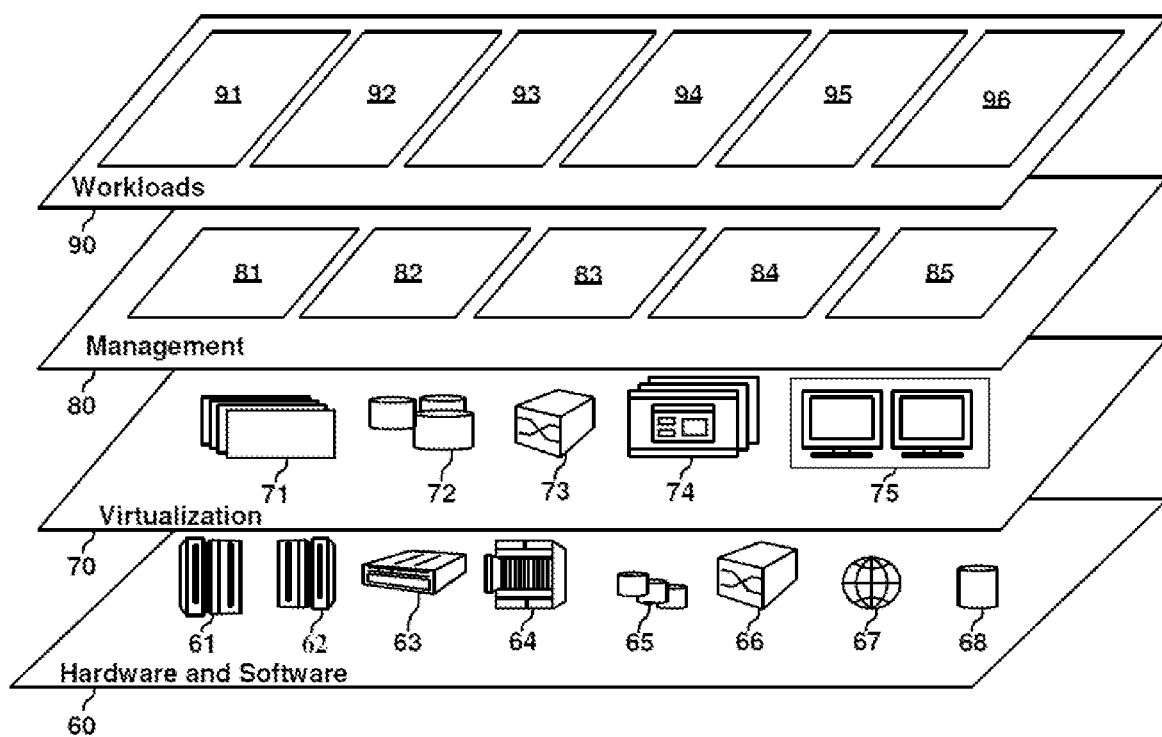
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex tasks for archiving accelerator-only database tables 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
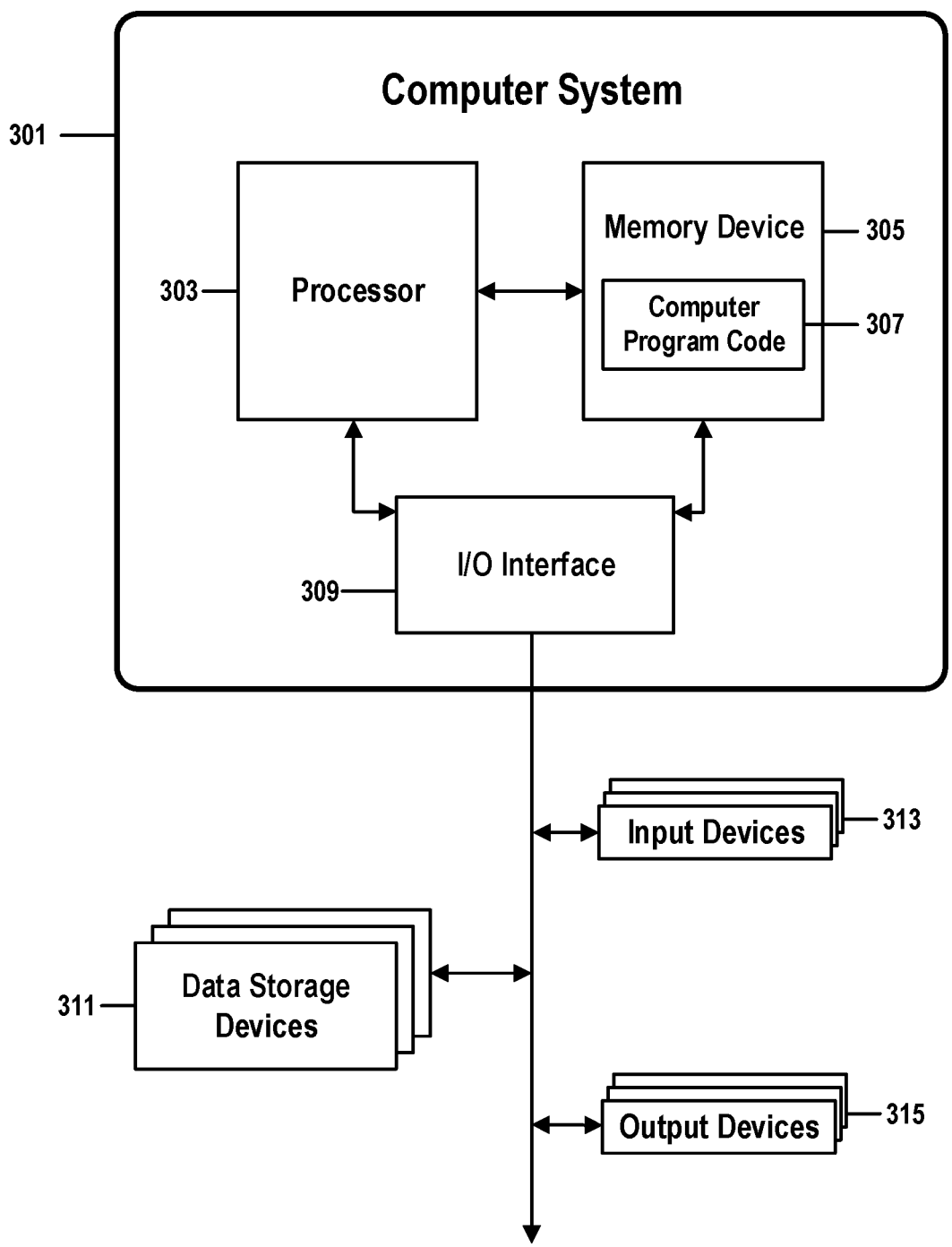
FIG. 3 shows the structure of a computer system and computer program code that may be used to implement a method for archiving accelerator-only database tables in accordance with embodiments of the present invention.

FIG. 3 shows a structure of a computer system and computer program code that may be used to implement a method for archiving accelerator-only database tables in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to: printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for archiving accelerator-only database tables in accordance with embodiments of the present invention, and may implement other embodiments described in this specification, including the methods illustrated in FIGS. 1-10. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for archiving accelerator-only database tables.

Any of the components of the present invention could be created, integrated, hosted, maintained, deployed, managed, serviced, supported, etc. by a service provider who offers to facilitate a method for archiving accelerator-only database tables. Thus the present invention discloses a process for deploying or integrating computing infrastructure, comprising integrating computer-readable code into the computer system 301, wherein the code in combination with the computer system 301 is capable of performing a method for archiving accelerator-only database tables.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for archiving accelerator-only database tables may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for archiving accelerator-only database tables is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
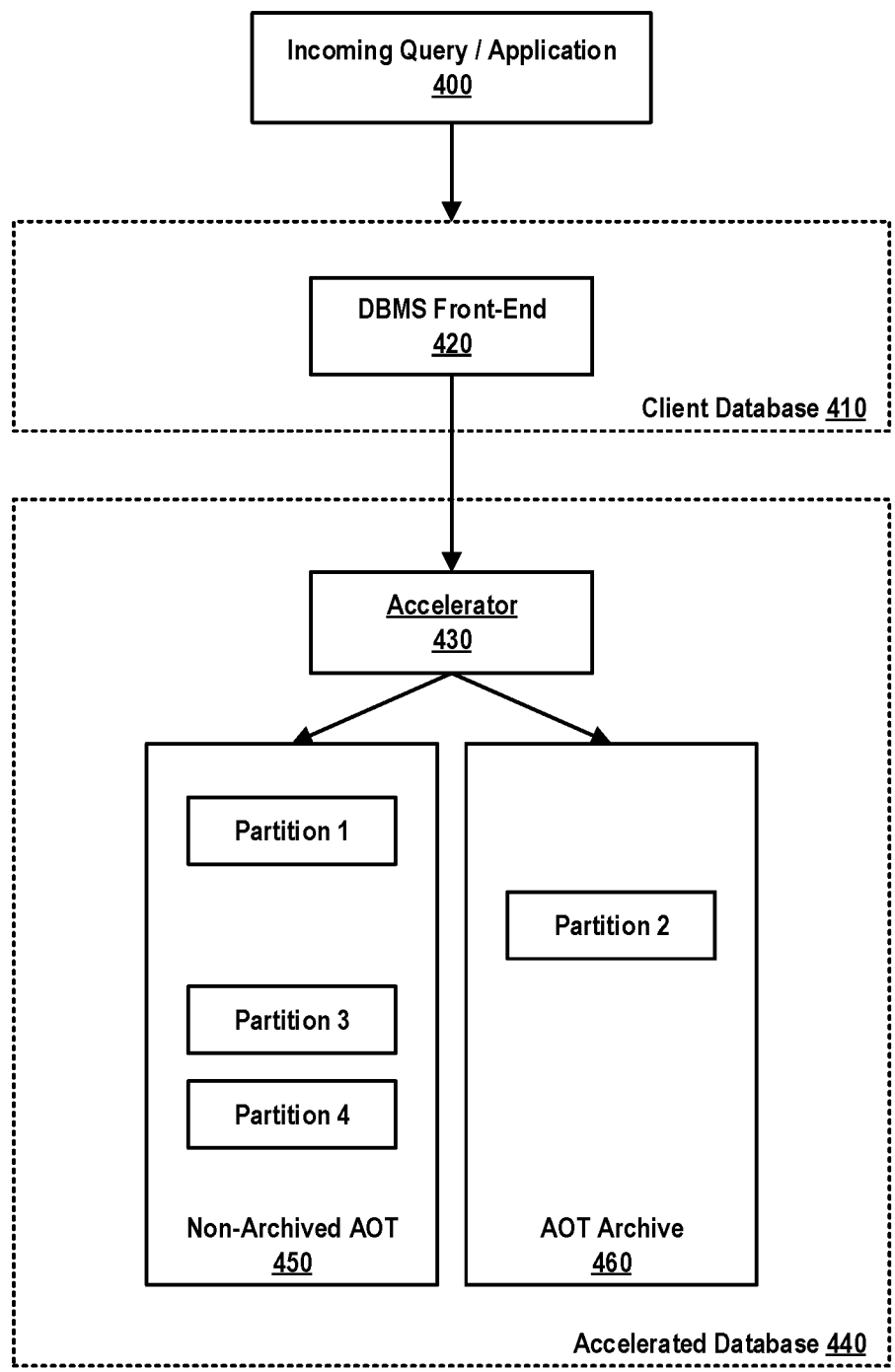
FIG. 4 is a flow chart that illustrates steps of a method for archiving accelerator-only database tables in accordance with embodiments of the present invention.

FIG. 4 shows a topology used by embodiments of the present invention when archiving AOTs. FIG. 4 shows items 400-460.

Known DBMSs that incorporate an accelerated database generally store both "regular" accelerated tables and AOTs. Regular tables each duplicate, and are synchronized with, a corresponding table in the DBMS's "conventional," non-accelerated client database.

In the example of FIG. 4, an embodiment of the present shows a DBMS system that comprises a client database 410 and an accelerated database 440. When a SQL query, or other data-access request 400 is received, the DBMS front-end 420 parses the request 400 and transmits it to an accelerator module 430 of the accelerated database 440. All access to the accelerated database 440 is managed by the accelerator 430.

When a DBMS module determines that a non-accelerated table, a row of a non-accelerated table, or some other partition of data stored in the client database 410, should be archived, the archived data is moved to a distinct storage repository dedicated to archived data.

The DBMS then directs the accelerator 430 to duplicate this operation on the corresponding regular tables of the accelerated database 440. In this way, the data stored in the regular accelerated tables is kept in sync with corresponding data in the client database 410.

A DBMS cannot use a similar procedure to archive contents of an AOT because the AOT has no analogous table in the client database 410. Therefore, when a query requests access to archived and non-archived rows of an AOT, the DBMS front-end 420 must perform additional steps, such as merging tables or generating filtering predicates that select either archived or non-archived rows.

Embodiments of the present invention improve upon known AOT archiving processes by moving archived AOT rows to a distinct archived AOT table 460. Accelerator 430, upon determining that a row, partition, or other component of an AOT 450 should be archived, moves the archival content from the non-archived AOT 450 to a second AOT 460 reserved for archived accelerator-only data.

If the accelerated database 440 supports horizontal table partitioning, each table 450 and 460, or each table record shown as partitions 1-4, could be a physically "real" partition stored in a distinct storage repository. Similarly, in other implementations, accelerated database 440 could implement partitions 1 through 4 as logical partitions, mapping individual table rows to partitions based on a selected predicate or condition.

In one example, rows could be selected for archiving as a function of whether a date specified by each row's Date column contains an odd-numbered date or an even-numbered date. If each partitions 1, 3, and 4 of FIG. 4 each specify an odd-numbered date, but partition 2 specifies an even numbered date, an operation that archives records with even-numbered dates would move partition 2 to AOT archive 460.

Once it has been determined that partition 2 of AOT 450 should be archived, accelerator 430 moves partition 2 from non-archived AOT 450 to archive AOT 460. As will be discussed below, when a query or application subsequently requests access to the original contents of table 450, accelerator 430 responds by accessing the contents of one or both of table 450 and 460. If the query requests only non-archived accelerator data, accelerator 430 accesses only non-archived AOT 450. If the query requests only archived accelerator data, accelerator 430 accesses only archived AOT 460. If the query requests both classes of accelerator data, accelerator 430 accesses merges AOT tables 450 and 460 and accesses rows contained in the merged view.

In all cases, DBMS front-end 420 parses query 400 to determine if query 400 requests access to an AOT. If the query requests access to archived or non-archived accelerator-only data, front-end 420 rewrites the query and forwards the modified query to accelerator 420. Accelerator 420, using its standard query-execution functionality, accesses the appropriate AOTs in accordance with the framework of FIG. 4. These rewriting steps and corresponding data-access procedures are described below.

Figure 5:
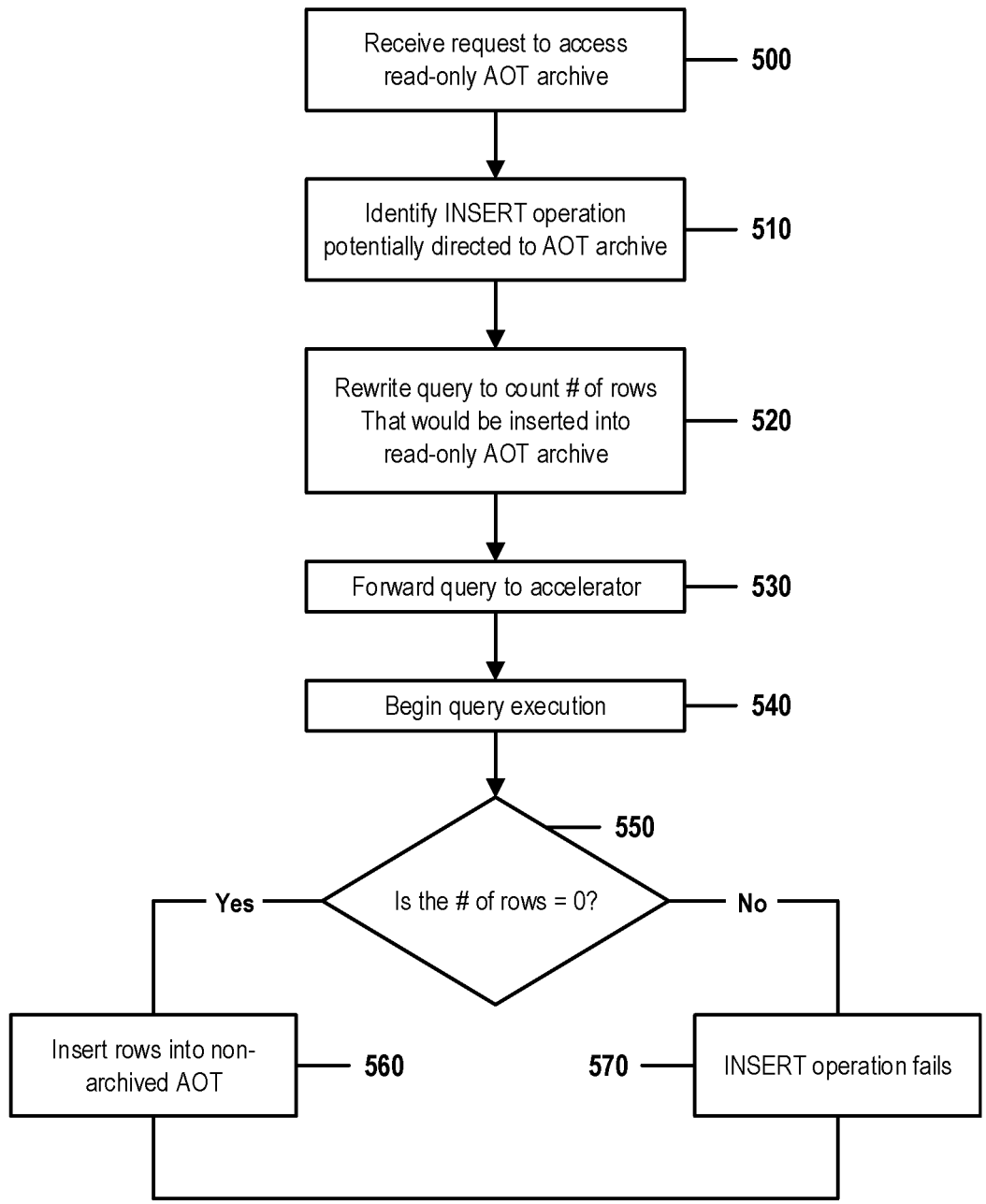
FIG. 5 is a flow chart that illustrates steps of a method, in accordance with embodiments of the present invention, for responding to a request to insert new data into a read-only accelerator-only archive.

FIG. 5 is a flow chart that illustrates steps of a method, in accordance with embodiments of the present invention, for responding to a request to insert new data into a read-only accelerator-only archive. FIG. 5 contains steps 500-570.

In some embodiments, AOTs, partitions, and other types of accelerator-only archives are configured to be read-only. The manner in which embodiments service requests to perform DML operations on an accelerator-only archive is in part determined by whether the archive is read-only.

Figure 6:
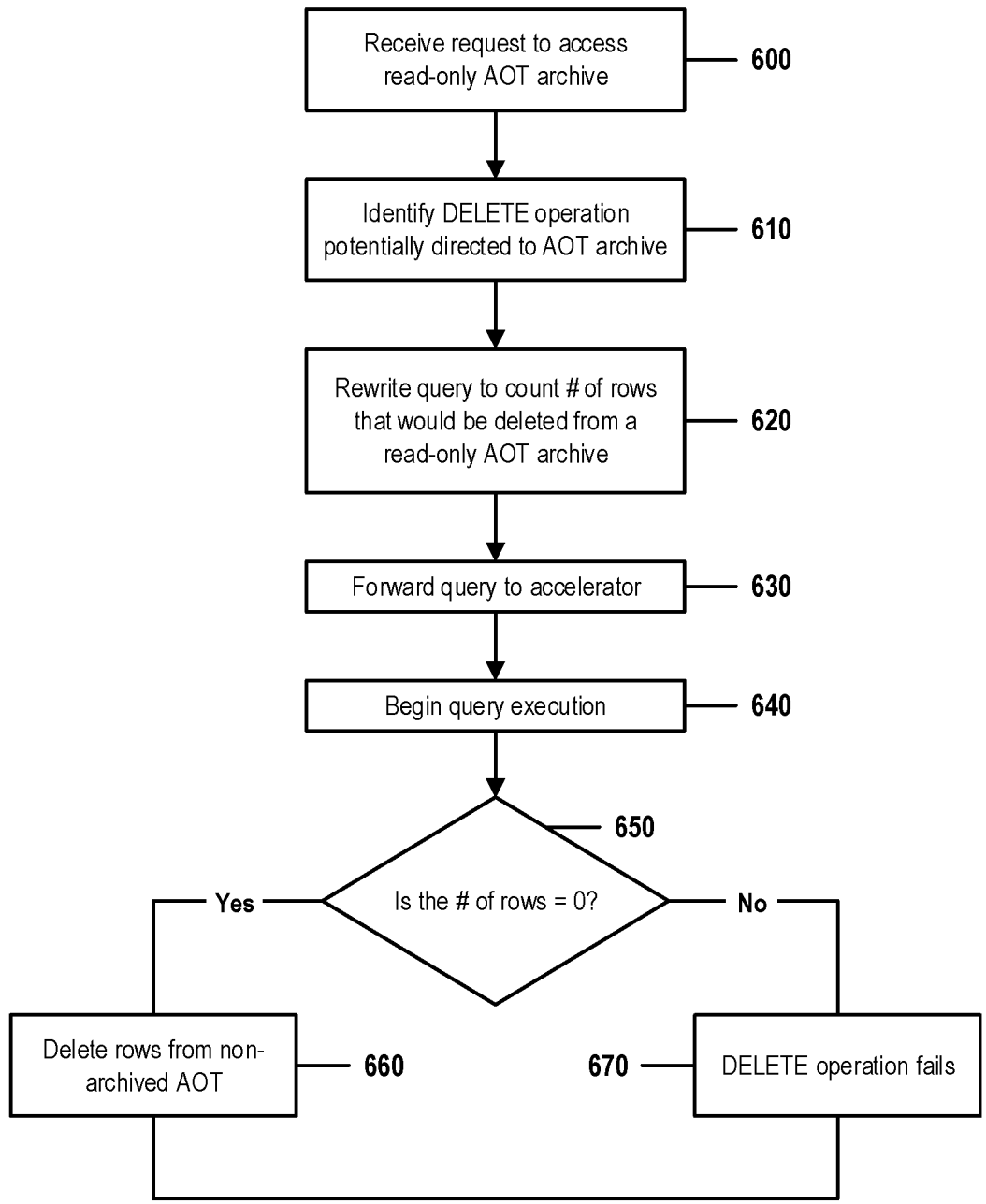
FIG. 6 is a flow chart that illustrates steps of a method, in accordance with embodiments of the present invention, for responding to a request to delete data from a read-only accelerator-only archive.
Figure 7:
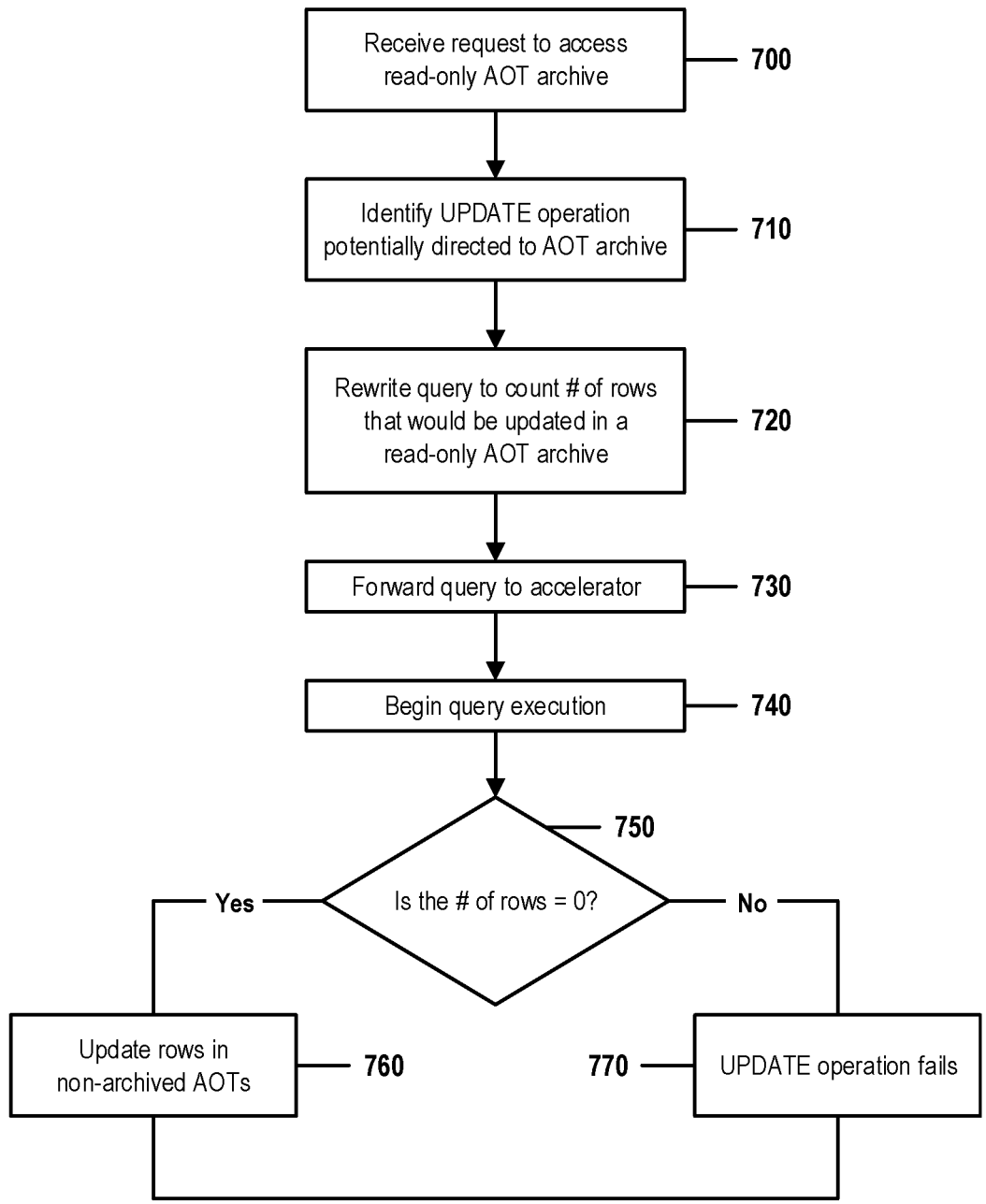
FIG. 7 is a flow chart that illustrates steps of a method, in accordance with embodiments of the present invention, for updating an accelerated database in which archived accelerator-only data is read-only.
Figure 8:
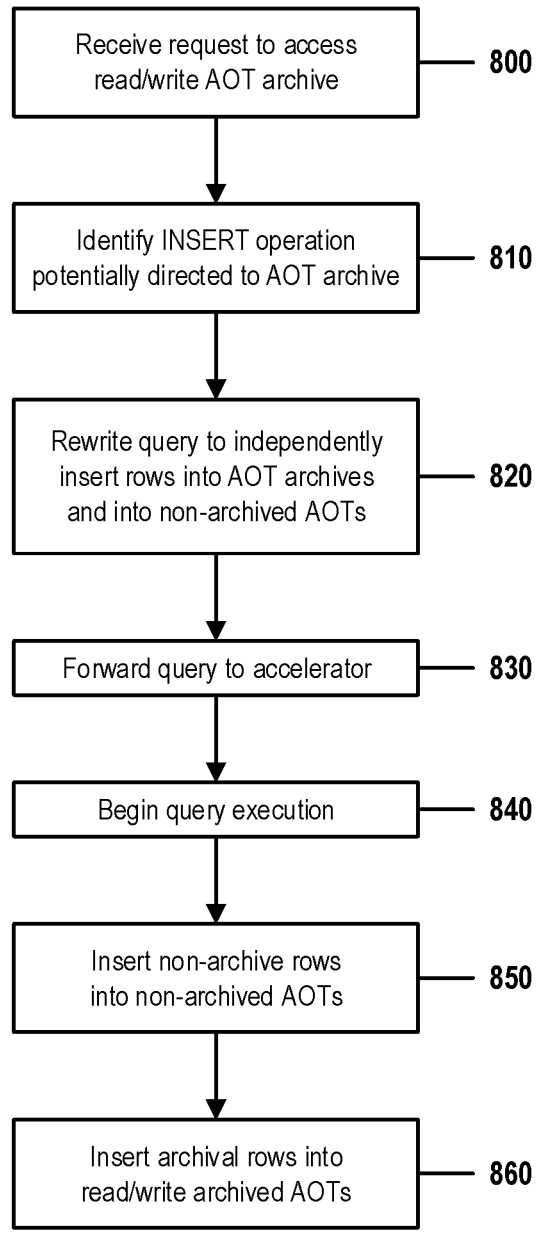
FIG. 8 is a flow chart that illustrates steps of a method, in accordance with embodiments of the present invention, for responding to a request to insert new data into a read/write accelerator-only archive.
Figure 9:
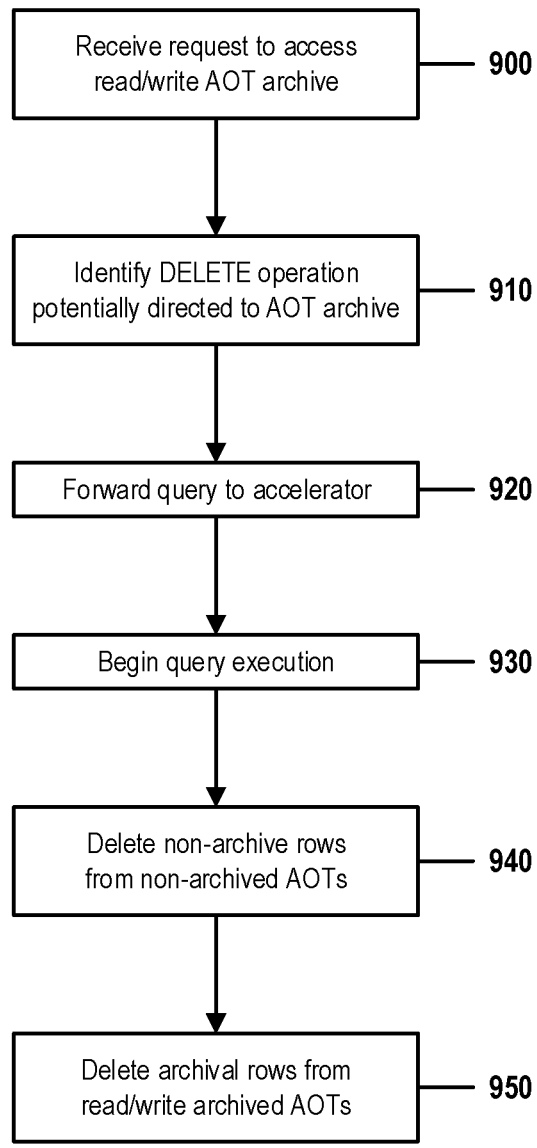
FIG. 9 is a flow chart that illustrates steps of a method, in accordance with embodiments of the present invention, for responding to a request to delete data from a read/write accelerator-only archive.
Figure 10:
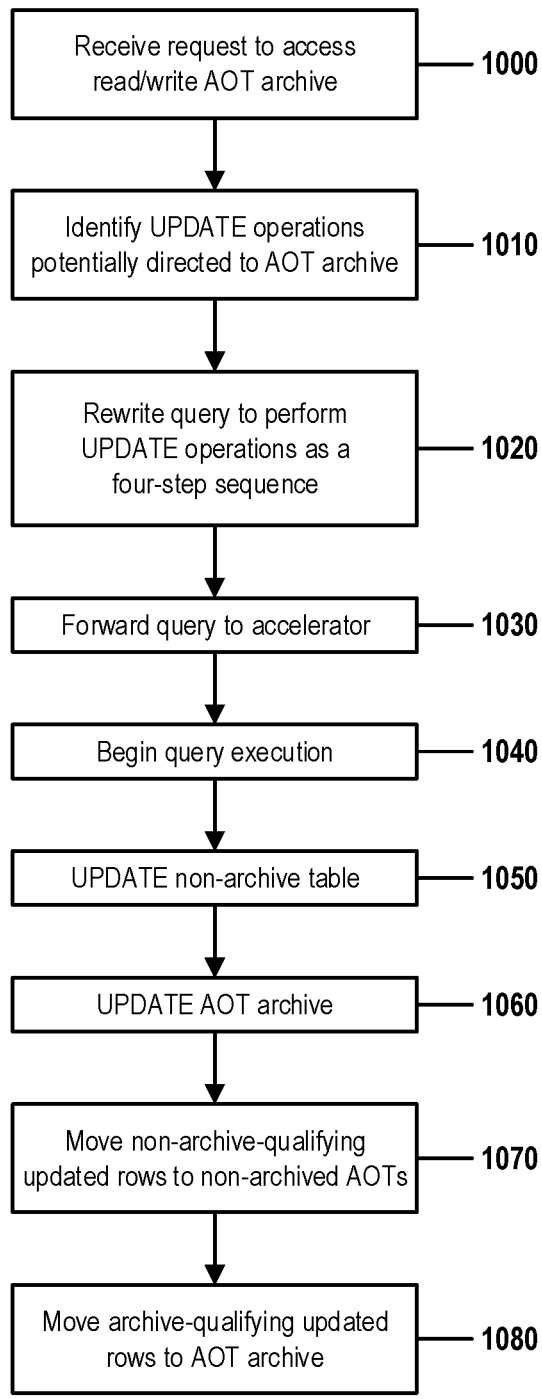
FIG. 10 is a flow chart that illustrates steps of a method, in accordance with embodiments of the present invention, for updating accelerator-only data where archived accelerator-only data is stored in a read/write format.

FIGS. 5-7 describe steps by which embodiments respond to requests to, respectively, perform an Insert, Delete, or Update DML operation on a read-only AOT archive. FIGS. 8-10 describe steps by which embodiments respond to requests to, respectively, perform an Insert, Delete, or Update DML operation on a read/write AOT archive.

In particular, accelerator 430 returns an error in response to any query that tries to revise or delete contents of a read-only accelerator-only archive. Records, rows, tables, or other types of permitted content can be inserted into a read-only accelerator-only archive only through a specialized procedure (such as a scheduled maintenance operation) that, in some embodiments, must be jointly performed by the DBMS front-end 420 and the accelerator 430. Such specialized procedures are outside the scope of the present invention. This document describes procedures that cannot insert new content into a read-only AOT archive.

The method of FIG. 5 requires the parsing component of a client DBMS front-end 420 to rewrite statements of a query that attempts to insert new data into an existing read-only AOT. This rewriting adds predicates that determine whether any of the new data items would satisfy a condition requiring the items to be archived. When forwarded to the accelerator 430, the rewritten query directs the accelerator 430 to make such a determination and to return an error condition if any such elements are identified.

In one example, a DBMS normally archives rows of an accelerator-only Sales.Logistics table that identify transactions over one year old. If a query requests the addition of ten new rows to the Sales.Logistics table, the method of FIG. 5 would determine whether any of those ten rows identifies a transaction that is over one year old. If any such rows are identified, the method would return an error condition, because fully servicing the query would involve inserting the identified rows into a read-only AOT archive—an operation that is not permitted.

In step 500, the DBMS front-end 420 receives a query or other data-access request.

In step 510, the DBMS front-end 420 parses the received query to determine that the query seeks to insert database rows (or, depending on implementation details, seeks to insert tables, records, or another type of data element) into an AOT.

In step 520, the DBMS front-end 420 rewrites the query to add predicates that determine how many of the rows to be inserted into an AOT satisfy conditions that would require those rows to be inserted into an accelerator-only archive.

In step 530, the DBMS front-end 420 forwards the rewritten query to accelerator 430.

In step 540, accelerator 430 begins execution of the rewritten query.

In step 550, accelerator 430 determines, as a result of performing the rewritten query, whether any of the rows to be inserted satisfy conditions for archiving. If none of the rows should be archived, the system performs step 560 to insert the requested rows into appropriate non-archived AOTs. But if any of the rows satisfy a condition by which rows are selected for archiving, the system instead performs step 570, returning an error condition caused by an attempt to improperly insert data into a read-only archive.

For example, consider an SQL query that contains the statements (line numbers added for reference):

(1) INSERT INTO <AOT>
(2) SELECT . . . FROM <any_other_table> WHERE <additional_predicates>

Here, line (1) requests that data be inserted into an AOT named <AOT>.

Line (2) sub-selects the data to be inserted from a database table named <any_other_table>, using conditions specified by the SQL predicates <additional_predicates>.

DBMS front-end 420 responds to the detection of these statements by rewriting the query to add the statements:

(3) SELECT COUNT(*)
(4) FROM (SELECT . . . FROM <any_other_table> WHERE <additional_predicates>)
(5) WHERE <archive_condition_predicates>

Line (3) counts the number of items returned by lines (4) and (5). Line (4) specifies that the items to be counted are culled from the view identified by sub-select conditions of line (2). Line (5) further filters the list of items returned by line (4) to include only items that satisfy archiving criteria specified by the SQL predicates <archive_condition_predicates>. In other words, lines (3)-(5) count the number of data elements that would be inserted by line (1) into a read-only AOT archive, rather than into a non-archive AOT.

Lines (3)-(5), when executed by accelerator 430, therefore return a non-zero count when the query attempts to insert accelerator-only data that must be archived upon insertion. Because the system is not allowed to change the contents of the read-only archive in this manner, the non-zero count causes the query to fail.

Examples and embodiments in this document should not be construed to limit the type of data-access requests to SQL-formatted queries. The present invention is flexible enough to accommodate any sort of SQL or non-SQL data-access request, so long as DBMS front-end 420 is capable of parsing and then rewriting the request in a manner that is functionally similar to that of the above example.

FIG. 6 is a flow chart that illustrates steps of a method, in accordance with embodiments of the present invention, for responding to a request to delete data from a read-only accelerator-only archive. FIG. 6 contains steps 600-670.

In step 600, the DBMS front-end 420 receives a query or other data-access request.

In step 610, the DBMS front-end 420 parses the received query to determine that the query seeks to delete database rows (or, depending on implementation details, seeks to delete tables, records, or another type of data element) from an AOT.

In step 620, the DBMS front-end 420 rewrites the query to add predicates that determine how many of the rows to be deleted satisfy conditions that would require those rows to be currently stored an accelerator-only archive.

In step 630, the DBMS front-end 420 forwards the rewritten query to accelerator 430.

In step 640, accelerator 430 begins execution of the rewritten query.

In step 650, accelerator 430 determines, as a result of performing the rewritten query, whether any of the rows to be deleted satisfy conditions for archiving. If none of the rows have been archived, the system performs step 660 to delete the requested rows from the rows' current storage locations in non-archived AOTs. But if any of the rows satisfy a condition by which rows are selected for archiving, the system instead performs step 670, returning an error condition caused by an attempt to improperly delete data from a read-only archive.

For example, consider an SQL query that contains the statements (line numbers added for reference):

(1) DELETE FROM <AOT>
(2) WHERE <additional_predicates>

Here, line (1) requests that data be deleted from an AOT named <AOT>.

Line (2) sub-selects the data to be deleted by listing conditions specified by the SQL predicates <additional_predicates>.

DBMS front-end 420 responds to the detection of these statements by rewriting the query to add the statements:

(3) SELECT COUNT(*)
(4) FROM (SELECT . . . FROM <AOT> WHERE <additional_predicates>
(5) WHERE <archive_condition_predicates>

Line (3) counts the number of items returned by lines (4) and (5). Line (4) specifies that the items to be counted are filtered from table <AOT> predicates of line (2). Line (5) further filters the list of items returned by line (4) to include only items that satisfy archiving criteria specified by the SQL predicates <archive_condition_predicates>. In other words, lines (3)-(5) count the number of data elements that would be deleted by lines (1) and (2) from a read-only AOT archive, rather than from a non-archive AOT.

Lines (3)-(5), when executed by accelerator 430, thus return a non-zero count when the query attempts to delete any archived accelerator-only data from a read-only AOT archive. Because the system is not allowed to delete data from a read-only archive, the non-zero count causes the query to fail.

FIG. 7 is a flow chart that illustrates steps of a method, in accordance with embodiments of the present invention, for updating an accelerated database in which archived accelerator-only data is read-only. FIG. 7 contains steps 700-770.

Performing a requested UPDATE operation that alters a data element stored in a non-archived AOT or partition such that the altered data element satisfies conditions for archiving. This operation may result in a non-archive AOT or partition containing data that should be stored in a read-only AOT archive. Similarly, performing an UPDATE operation that alters a previously archived data element such that the altered data element no longer satisfies conditions for archiving results in an AOT archive or partition containing data that should not be archived.

One solution is to update accelerator-only partitions and tables with a combination of the DELETE and INSERT procedures described in FIGS. 5 and 6. This procedure, however, works correctly only when updating a single row.

For example, consider a query that contains an UPDATE statement that updates "discount" columns of rows that store "age" values no greater than 30:

(1) UPDATE customer
(2) SET discount=discount−10%
(3) WHERE age<=30

This operation cannot be correctly implemented by performing the DELETE operation of FIG. 6, followed by the INSERT operation of FIG. 5. Deleting all qualifying rows from the target table would necessitate additional steps to store the deleted content in a cache or other temporary location. If no such storage operation is performed, the system would not know which values to insert after the original rows were deleted.

Similarly, performing the INSERT before the DELETE would temporarily add duplicate rows to the updated table, potentially violating uniqueness constraints and requiring additional code to select which rows to delete and which to retain during the DELETE operation. These issues become even more complex if the columns to be updated are also used by query predicates to determine whether updating a row changes that row's qualifications for archiving.

In other words, an UPDATE operation that causes a data element to become qualified for archiving must fail because the UPDATE operation cannot add data to a read-only accelerated archive. Similarly, updating an archived data element to values that no longer qualify for archiving must fail because the UPDATE operation cannot delete that element from a read-only accelerated archive.

Accordingly, the method of FIG. 7, prior to actually updating a row, rewrites a query to first determine whether the update would change that row's archive status. This prevents the system from producing results that would require the row to be inserted into or deleted from a read-only accelerator-only archive.

As described below, the system incorporates the UPDATE statement's predicates (from lines (2) and (3)) into a SELECT statement that can be evaluated to identify the rows to be selected and the values to which the selected rows would be updated. The resulting query statements may be performed regardless of whether any values or literals specified in lines (2) and (3) refer to columns used by predicates to identify archived rows.

Accordingly, in the running example, DBMS front-end 420 would rewrite the submitted query to include the statements:

(4) SELECT COUNT(*)
(5) FROM (SELECT discount−10% FROM customer WHERE age <=30>)
(6) WHERE <archive_condition_predicates>

As in the methods of FIGS. 5 and 6, line (4) counts the number of rows identified by line (5) as being generated by the original UPDATE statement and then, in line (6), filters the result set to include only updated rows that qualify to be archived. The resulting code indicates whether the UPDATE procedure would identify archived rows, allowing the system to return an error condition if there is an attempt to insert rows into or delete rows from a read-only archive.

This procedure is detailed in the method of FIG. 7:

In step 700, the DBMS front-end 420 receives a query or other data-access request.

In step 710, the DBMS front-end 420 parses the received query to determine that the query seeks to update database rows (or other types of stored database content) of an AOT or partition.

In step 720, the DBMS front-end 420 rewrites the query to add statements that determine how many of the rows, as a result of the updating, would then have to be moved into a read-only accelerator-only archive.

In step 730, the DBMS front-end 420 forwards the rewritten query to accelerator 430.

In step 740, accelerator 430 begins execution of the rewritten query.

In step 750, accelerator 430 determines, as a result of performing the rewritten query, whether any of the rows to be updated would, upon being updated satisfy conditions for archiving. If lines (4)-(6) return a count of zero, the system performs step 760 to complete the requested UPDATE operation. Otherwise, the system performs step 770, returning an error caused by an attempt to improperly update data into a read-only archive.

FIGS. 8-10 illustrate methods for, respectively, performing INSERT, DELETE, and UPDATE DML operations that affect the contents of read/write accelerator-only archives.

FIG. 8 is a flow chart that illustrates steps of a method, in accordance with embodiments of the present invention, for responding to a request to insert new data into a read/write accelerator-only archive. FIG. 8 contains steps 800-860.

In step 800, the DBMS front-end 420 receives a query or other data-access request.

In step 810, the DBMS front-end 420 parses the received query to determine that the query seeks to insert database rows (or, depending on implementation details, seeks to insert tables, records, or another type of data element) into an AOT. As in FIG. 5, one example of such statements is:
(1) INSERT INTO <AOT>
(2) SELECT . . . FROM <any_other_tables> WHERE <additional_predicates>

In step 820, the DBMS front-end 420 rewrites the query to contain two distinct INSERT statements, one that references rows or other data elements to be inserted into an AOT archive and one that references rows or other data elements to be inserted into a non-archive AOT. For example, the front-end 420 would respond to receiving the exemplary SQL statements (1) and (2) by adding:
(3) INSERT INTO <non-archive_AOT>
(4) SELECT *
(5) FROM (SELECT . . . FROM <any_other_tables> WHERE <additional_predicates>)
(6) WHERE NOT(<archive-condition_predicates>)
(7) INSERT INTO <archive_AOT
(8) SELECT *
(9) FROM (SELECT . . . FROM <any_other_tables> WHERE <additional_predicates>)
(10) WHERE <archive-condition_predicates>

In this example, lines (4)-(5) select all rows to be inserted by lines (1) and (2) by quoting the expressions and predicates of line (2) that select rows to be inserted. Line (6) filters the selected rows to delete rows that qualify for archiving. Line (3) thus inserts, into a regular (that is, non-archived) AOT or partition, the subset of inserted rows that should not be archived.

Like lines (4)-(5), lines (8)-(9) select all rows to be inserted by lines (1) and (2). Line (10) filters this set of rows to include only rows that qualify for archiving. Line (7) then inserts the filtered results in an AOT archive. Because embodiments of the present invention have split each AOT into archived and non-archived read-only tables or partitions, statements (4) and (8) split the rows to be inserted into two distinct subsets, one of which is inserted into an archive AOT and one of which is inserted into a non-archived AOT.

In another example, a query identifies rows to insert by means of an SQL VALUES clause instead of a sub-select:
(1a) INSERT INTO <AOT>
(2a) SELECT . . . FROM TABLE (VALUES ( . . . )) AS t(<column-names>

In such cases, front-end 420 rewrites the query to add statements analogous to those of lines (3)-(8), again selecting records to insert by copying the query's original method of generating a view:
(3a) INSERT INTO <non-archive_AOT>
(4a) SELECT *
(5a) FROM TABLE (VALUES ( . . . )) AS t(<column-names>
(6a) WHERE NOT(<archive-predicates>)
(7a) INSERT INTO <archive_AOT>
(8a) SELECT *
(9a) FROM TABLE (VALUES ( . . . )) AS t(<column-names>
(10a) WHERE <archive-predicates>

In step 830, the DBMS front-end 420 forwards the rewritten query to accelerator 430.

In step 840, accelerator 430 begins execution of the rewritten query.

In step 850, accelerator 430, as directed by lines (3)-(6) or (3a)-(6a), inserts rows that do not qualify for archiving into appropriate non-archive AOTs or partitions.

In step 860, accelerator 430, as directed by lines (7)-(10) or (7a)-(10a), inserts rows that qualify for archiving into appropriate AOTs or partitions that store archived data.

FIG. 9 is a flow chart that illustrates steps of a method, in accordance with embodiments of the present invention, for responding to a request to delete data from a read/write accelerator-only archive. FIG. 9 contains steps 900-950.

Unlike other operations performed by embodiments of the present invention, processing a query that attempts to perform a DELETE-type operation does not require rewriting the query, so long as the system's accelerator-only archives are writeable (that is, not read-only). In such cases, the system leverages the embodiment's division of each AOT into archived and non-archived tables or partitions by simply performing a distinct set of deletions for each class of data.

In step 900, the DBMS front-end 420 receives a query or other data-access request.

In step 910, the DBMS front-end 420 parses the received query to determine that the query seeks to delete database rows (or, depending on implementation details, seeks to delete tables, records, or another type of data element) from one or more AOTs.

In step 920, the DBMS front-end 420 forwards the received query to accelerator 430.

In step 930, accelerator 430 begins execution of the forwarded query.

In step 940, accelerator 430 deletes, from non-archived AOTs of the accelerated database, a first subset of the rows specified by the query. DBMS front-end 420 or accelerator 430 will have identified, through known means, that each row of the first subset contains data that should not be archived.

In step 950, accelerator 430 deletes, from the accelerated database's read/write AOT archives, a second subset of the rows specified by the query. DBMS front-end 420 or accelerator 430 will have identified, through known means, that each row of the first subset contains accelerator-only data that should be archived.

FIG. 10 is a flow chart that illustrates steps of a method, in accordance with embodiments of the present invention, for updating accelerator-only data where archived accelerator-only data is stored in a read/write format. FIG. 10 contains steps 1000-1080.

When a system incorporating read/write accelerator-only archives executes an AOT UPDATE request, four results are possible:

i) an archived data element is updated to data that no longer qualifies for archiving; the updated data element must then be moved to a non-archive AOT or partition;

ii) a non-archived data element is updated to data that qualifies for archiving; the updated data element must then be moved to an archived AOT or partition;

iii) an archived data element is updated to data that still qualifies for archiving; the updated data element is not moved to a different table or partition; and iv) a non-archived data element is updated to data that still does not qualify for archiving; the updated data element is not moved to a different table or partition.

It is not possible, however, to perform four distinct UPDATE operations that would, respectively:

(i) perform an UPDATE operation on non-archived tables or partitions for each non-archived row that remains non-archived after updating;

(ii) perform an UPDATE operation on AOT archives for all archived rows that remain archived after updating;

(iii) perform an INSERT/DELETE operation on non-archived rows that must be moved from a non-archived table or partition to an accelerator-only archive after updating; and (iv) perform an INSERT/DELETE operation on archived rows that must be moved from an accelerator-only archive to a non-archived table or partition after updating.

The problem with this approach is that modifying a distinct row more than once during a single query exposes updated data to potential corruption unless all affected tables are protected from concurrent alteration by any other process throughout the duration of all four sets of queries. Furthermore, as is known in the art, even the order in which rows are updated by operations (i)-(iv) above can in some cases produce inconsistent results.

Embodiments of the present invention address this issue by performing a different sequence of operations that avoids updating any distinct row stored in a distinct table or partition more than once:

1) perform an UPDATE operation on all rows of non-archived tables or partitions 2) perform an UPDATE operation on all rows of archived tables or partitions 3) move any archive-qualifying rows from the non-archived tables or partitions to the archived tables or partitions 4) move any non-archive-qualifying rows from the archived tables or partitions to the non-archived tables or partitions Here, operations 1) and 2) operate on different tables and, therefore, cannot modify the same row twice. Operations 3) and 4) merely move rows from one table to another, and thus do not modify any row. This four-operation procedure thus never modifies the same row twice.

Rewriting the query to add statements that perform these operations is a straightforward procedure similar to that of the examples of FIGS. 5-9. For example, the contents of an updated row may be identified as qualifying (or not qualifying) for archiving by applying the same <archive_condition_predicates> described in the preceding figures. Once a row's final destination has been identified, moving the row from one table or partition to another can be performed by performing an INSERT operation and a DELETE operation in a conventional manner.

This procedure is generalized by the method of FIG. 10:

In step 1000, DBMS front-end 420 receives a query or other data-access request.

In step 1010, the DBMS front-end 420 parses the received query to determine that the query seeks to update database rows (or, depending on implementation details, seeks to insert tables, records, or another type of data element) into an AOT.

In step 1020, the DBMS front-end 420 rewrites the query to implement the four-step procedure 1)-4) described above.

In step 1030, the DBMS front-end 420 forwards the rewritten query to accelerator 430.

In step 1040, accelerator 430 begins execution of the rewritten query.

In step 1050, accelerator 430 performs UPDATE operations, specified by the rewritten query, on all rows currently stored in non-archived tables or partitions.

In step 1060, accelerator 430 performs UPDATE operations, specified by the rewritten query, on all rows currently stored in archived AOTs or partitions. In some embodiments, steps 1050 and 1060 may be performed in reverse order.

In step 1070, accelerator 430 moves any updated rows that now qualify for archiving, and that are currently stored in non-archived tables or partitions, to their correct accelerator-only archives In step 1080, accelerator 430 moves any updated rows that no longer qualify for archiving, and that are currently stored in an accelerator-only archive, to their correct non-archived tables or partitions. In some embodiments, steps 1070 and 1080 may be performed in reverse order.

The methods of FIGS. 5-10 can be extended to other types of queries submitted to a database compliant with the topology of FIGS. 1-4. For example, a request to access accelerator-only data that does not expressly request archived data would be executed against a non-archived AOT containing hot data. But a query that does not limit results to non-archived data, would be rewritten by DBMS front-end 420 to perform a UNION ALL operation that first merges the contents of an archive with the archive's corresponding non-archived table. The above methods guarantee that the returned result set will contain no duplicates.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) comprising a processor, a memory coupled to the processor, and a computer-readable hardware storage device coupled to the processor, the storage device containing program code configured to be run by the processor via the memory to implement a method for archiving accelerator-only database tables, the method comprising:

the DBMS determining that a row of a non-archived accelerator-only table (AOT) has become qualified for archiving,
where the DBMS manages a production database and an accelerated database, and
where the AOT is stored in the accelerated database; and
the DBMS moving the row from the AOT to an accelerator-only archive,
where the AOT and the accelerator-only archive are stored on storage media that provide a same level of performance,
where the row contains only metadata and usage statistics that describe characteristics of the production database and that are distinct from any data stored in the production database, and
where the moving is performed in response to receiving a user request submitted to the production database.

2. The system of claim 1,
where a front-end of the DBMS intercepts and parses user requests to access the data stored in the accelerated database and then forwards each parsed request to an accelerator module of the DBMS that executes the parsed request against one or more rows of data stored in the accelerated database, and
where the DBMS receives an incoming request that requests a performance of a data-manipulation operation upon the one or more rows of data stored in the accelerated database.

3. The system of claim 2,
where the data-manipulation operation is selected from the group consisting of:
an insert operation that inserts one or more new rows into one or both of the AOT and the accelerator-only archive,
a delete operation that deletes one or more existing rows from one or both of the AOT and the accelerator-only archive, and
an update operation that revises data stored in one or more existing rows of one or both of the AOT and the accelerator-only archive.

4. The system of claim 3, where the accelerator-only archive is stored in a read-only format.

5. The system of claim 4, where the data-manipulation operation is an insert operation, further comprising:
the DBMS rewriting the incoming request to add statements that direct the accelerator to count a number of rows that would be inserted by the insert operation and that are qualified for archiving;
the DBMS forwarding the rewritten request to the accelerator module; and
the DBMS returning an error message if receiving notice from the accelerator module that the number of rows is greater than zero.

6. The system of claim 4, where the data-manipulation operation is a delete operation, further comprising:
the DBMS rewriting the incoming request to add statements that direct the accelerator to count a number of rows that would be deleted by the delete operation and that are qualified for archiving;
the DBMS forwarding the rewritten request to the accelerator module; and
the DBMS returning an error message if receiving notice from the accelerator module that the number of rows is greater than zero.

7. The system of claim 4, where the data-manipulation operation is an update operation, further comprising:
the DBMS rewriting the incoming request to add statements that direct the accelerator to count a number of rows that would be revised by the update operation and that would become qualified for archiving after being revised by the update operation;
the DBMS forwarding the rewritten request to the accelerator module; and
the DBMS returning an error message if receiving notice from the accelerator module that the number of rows is greater than zero.

8. The system of claim 3, where the accelerator-only archive is stored in a read/write format.

9. The system of claim 8, where the data-manipulation operation is an insert operation, further comprising:
the DBMS rewriting the incoming request to add statements that direct the accelerator to:
identify which rows, of the rows that would be inserted by the insert operation, are qualified for archiving,
insert each row that is identified by the rewritten request as being qualified for archiving into the accelerator-only archive, and
insert each row that is identified by the rewritten request as being unqualified for archiving into the AOT; and
the DBMS forwarding the rewritten request to the accelerator module.

10. The system of claim 8, where the data-manipulation operation is a delete operation, further comprising: the DBMS forwarding the incoming request to the accelerator module.

11. The system of claim 8, where the data-manipulation operation is an update operation, further comprising:
the DBMS rewriting the incoming request to replace the data-manipulation operation with statements that direct the accelerator to:
update each row requested to be updated by the update operation,
move any row that does not qualify for archiving before the updating, but would qualify for archiving after the updating, to the accelerator-only archive, and
move any row that qualifies for archiving before the updating, but would no longer qualify for archiving after the updating, to the AOT; and
the DBMS forwarding the rewritten request to the accelerator module.

12. A method for archiving accelerator-only database tables, the method comprising:
a database-management system (DBMS) determining that a row of a non-archived accelerator-only table (AOT) has become qualified for archiving,
where the DBMS manages a production database and an accelerated database, and
where the AOT is stored in the accelerated database; and
the DBMS moving the row from the AOT to an accelerator-only archive, where the AOT and the accelerator-only archive are stored on storage media that provide a same level of performance,
where the row contains only metadata and usage statistics that describe characteristics of the production database and that are distinct from any data stored in the production database, and
where the moving is performed in response to receiving a user request submitted to the production database.

13. The method of claim 12,
where a front-end of the DBMS intercepts and parses user requests to access the data stored in the accelerated database and then forwards each parsed request to an accelerator module of the DBMS that executes the parsed request against one or more rows of data stored in the accelerated database, and
where the DBMS receives an incoming request that requests a performance of a data-manipulation operation upon the one or more rows of data stored in the accelerated database,
where the data-manipulation operation is selected from the group consisting of:
an insert operation that inserts one or more new rows into one or both of the AOT and the accelerator-only archive,
a delete operation that deletes one or more existing rows from one or both of the AOT and the accelerator-only archive, and
an update operation that revises data stored in one or more existing rows of one or both of the AOT and the accelerator-only archive.

14. The method of claim 13, where the accelerator-only archive is stored in a read-only format and where:
if the data-manipulation operation is an insert operation, further comprising:
the DBMS rewriting the incoming request to add statements that direct the accelerator to count a number of rows that would be inserted by the insert operation and that are qualified for archiving;
the DBMS forwarding the rewritten request to the accelerator module; and
the DBMS returning an error message if receiving notice from the accelerator module that the number of rows is greater than zero;
if the data-manipulation operation is a delete operation, further comprising:
the DBMS rewriting the incoming request to add statements that direct the accelerator to count a number of rows that would be deleted by the delete operation and that are qualified for archiving;
the DBMS forwarding the rewritten request to the accelerator module; and
the DBMS returning an error message if receiving notice from the accelerator module that the number of rows is greater than zero; and
if the data-manipulation operation is an update operation, further comprising:
the DBMS rewriting the incoming request to add statements that direct the accelerator to count a number of rows that would be revised by the update operation and that would become qualified for archiving after being revised by the update operation;
the DBMS forwarding the rewritten request to the accelerator module; and
the DBMS returning an error message if receiving notice from the accelerator module that the number of rows is greater than zero.

15. The method of claim 13, where the accelerator-only archive is stored in a read/write format and where:
if the data-manipulation operation is an insert operation, further comprising:
the DBMS rewriting the incoming request to add statements that direct the accelerator to:
identify which rows, of the rows that would be inserted by the insert operation, are qualified for archiving,
insert each row that is identified by the rewritten request as being qualified for archiving into the accelerator-only archive, and
insert each row that is identified by the rewritten request as being unqualified for archiving into the AOT; and
the DBMS forwarding the rewritten request to the accelerator module;
if the data-manipulation operation is a delete operation, further comprising the DBMS forwarding the incoming request to the accelerator module; and
if the data-manipulation operation is an update operation, further comprising:
the DBMS rewriting the incoming request to replace the data-manipulation operation with statements that direct the accelerator to:
update each row requested to be updated by the update operation,
move any row that does not qualify for archiving before the updating, but would qualify for archiving after the updating, to the accelerator-only archive, and
move any row that qualifies for archiving before the updating, but would no longer qualify for archiving after the updating, to the AOT; and
the DBMS forwarding the rewritten request to the accelerator module.

16. The method of claim 12, further comprising providing at least one support service for at least one of creating, integrating, hosting, maintaining, and deploying computer-readable program code in the computer system, wherein the computer-readable program code in combination with the computer system is configured to implement the determining and the moving.

17. A computer program product for a database-management system (DBMS), the computer program product comprising a computer readable storage medium having program instructions embodied therewith, the program instructions executable by a processor to cause the processor to perform a method for archiving accelerator-only database tables, the method comprising:
a database-management system (DBMS) determining that a row of a non-archived accelerator-only table (AOT) has become qualified for archiving,
where the DBMS manages a production database and an accelerated database, and
where the AOT is stored in the accelerated database; and
the DBMS moving the row from the AOT to an accelerator-only archive,
where the AOT and the accelerator-only archive are stored on storage media that provide a same level of performance,
where the row contains only metadata and usage statistics that describe characteristics of the production database and that are distinct from any data stored in the production database, and where the moving is performed in response to receiving a user request submitted to the production database.

18. The computer program product of claim 17, where a front-end of the DBMS intercepts and parses user requests to access the data stored in the accelerated database and then forwards each parsed request to an accelerator module of the DBMS that executes the parsed request against one or more rows of data stored in the accelerated database, and where the DBMS receives an incoming request that requests a performance of a data-manipulation operation upon the one or more rows of data stored in the accelerated database, where the data-manipulation operation is selected from the group consisting of:
- an insert operation that inserts one or more new rows into one or both of the AOT and the accelerator-only archive,
- a delete operation that deletes one or more existing rows from one or both of the AOT and the accelerator-only archive, and
- an update operation that revises data stored in one or more existing rows of one or both of the AOT and the accelerator-only archive.

19. The computer program product of claim 18, where the accelerator-only archive is stored in a read-only format and where:

if the data-manipulation operation is an insert operation, further comprising:
- the DBMS rewriting the incoming request to add statements that direct the accelerator to count a number of rows that would be inserted by the insert operation and that are qualified for archiving;
- the DBMS forwarding the rewritten request to the accelerator module; and
- the DBMS returning an error message if receiving notice from the accelerator module that the number of rows is greater than zero;

if the data-manipulation operation is a delete operation, further comprising:
- the DBMS rewriting the incoming request to add statements that direct the accelerator to count a number of rows that would be deleted by the delete operation and that are qualified for archiving;
- the DBMS forwarding the rewritten request to the accelerator module; and
- the DBMS returning an error message if receiving notice from the accelerator module that the number of rows is greater than zero; and if the data-manipulation operation is an update operation, further comprising:
- the DBMS rewriting the incoming request to add statements that direct the accelerator to count a number of rows that would be revised by the update operation and that would become qualified for archiving after being revised by the update operation;
- the DBMS forwarding the rewritten request to the accelerator module; and
- the DBMS returning an error message if receiving notice from the accelerator module that the number of rows is greater than zero.

20. The computer program product of claim 18, where the accelerator-only archive is stored in a read/write format and where:

if the data-manipulation operation is an insert operation, further comprising:
- the DBMS rewriting the incoming request to add statements that direct the accelerator to:
  - identify which rows, of the rows that would be inserted by the insert operation, are qualified for archiving,
  - insert each row that is identified by the rewritten request as being qualified for archiving into the accelerator-only archive, and
  - insert each row that is identified by the rewritten request as being unqualified for archiving into the AOT; and
- the DBMS forwarding the rewritten request to the accelerator module;

if the data-manipulation operation is a delete operation, further comprising the DBMS forwarding the incoming request to the accelerator module; and if the data-manipulation operation is an update operation, further comprising:
- the DBMS rewriting the incoming request to replace the data-manipulation operation with statements that direct the accelerator to:
  - update each row requested to be updated by the update operation,
  - move any row that does not qualify for archiving before the updating, but would qualify for archiving after the updating, to the accelerator-only archive, and
  - move any row that qualifies for archiving before the updating, but would no longer qualify for archiving after the updating, to the AOT; and
- the DBMS forwarding the rewritten request to the accelerator module.

* * * * *